United States Patent

Himes

[11] 3,791,541
[45] Feb. 12, 1974

[54] CARGO PLATFORM
[75] Inventor: William H. Himes, Dayton, Ohio
[73] Assignee: Leyman Manufacturing Corporation, Cincinnati, Ohio
[22] Filed: Feb. 16, 1971
[21] Appl. No.: 115,837

Related U.S. Application Data
[63] Continuation of Ser. No. 872,108, Oct. 29, 1969, abandoned.

[52] U.S. Cl. ................................. 214/75 T, 187/9
[51] Int. Cl. ............................................ B60p 1/44
[58] Field of Search ....................... 214/75 T; 187/9

[56] References Cited
UNITED STATES PATENTS

| | | | |
|---|---|---|---|
| 2,530,341 | 11/1950 | Satsky | 214/75 T |
| 3,305,111 | 2/1967 | Isaacs | 214/77 |
| 2,727,781 | 12/1955 | D'Eath | 214/85 |
| 3,371,805 | 3/1968 | Himes | 214/75 T |

Primary Examiner—Robert J. Spar
Assistant Examiner—Lawrence J. Oresky
Attorney, Agent, or Firm—Wood, Herron & Evans

[57] ABSTRACT

A cargo platform of the type mounted on the rear of trailer trucks that is particularly adapted for use with a combined elevating and storing mechanism for such platforms. The cargo platform includes, in the preferred embodiment, a first section of the platform mounted along the front edge thereof to be combined elevating and storing mechanism by a first pivotal joint, a second section of the cargo platform mounted to the first section adjacent the rear edge of the first section by a second pivotal joint, supports associated with the two sections for holding the sections in platform configuration when desired, locks associated with the two sections for holding the two sections in sandwich configuration when desired, the sections being pivotable between platform configuration and sandwich configuration by means of the second pivotal joint, and at least one wheel fixed to one of the sections adjacent that edge where the sections are pivotally joined, the wheel providing a rolling surface that maintains contact with the ground as the platform, when in sandwich configuration, is lifted at the first pivotal joint from a horizontal attitude whereat it rests on the ground and extends outwardly of the first pivotal joint to a vertical attitude whereat it hangs in the same plane as the vertical plane incorporating the first pivotal joint.

4 Claims, 12 Drawing Figures

3,791,541
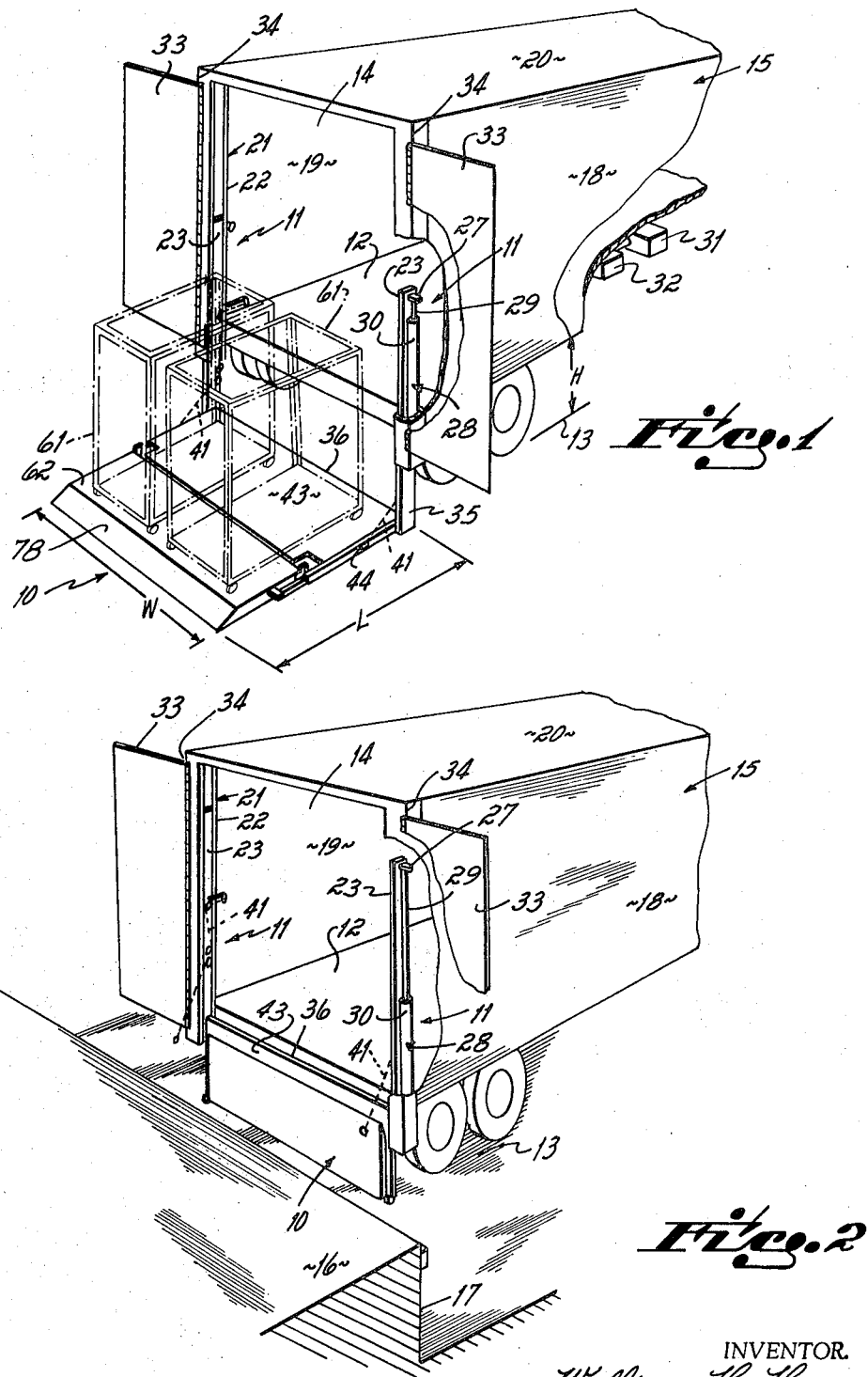

INVENTOR.
William H. Himes
BY
Wood, Herron & Evans
ATTORNEYS

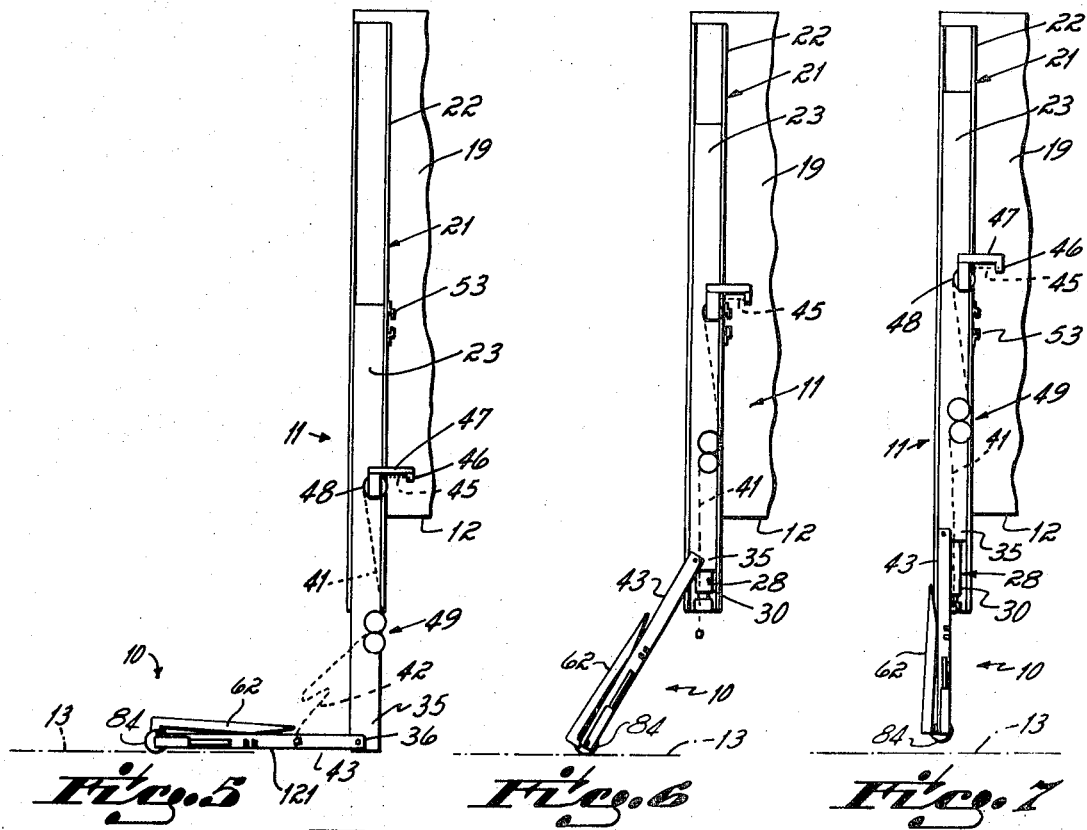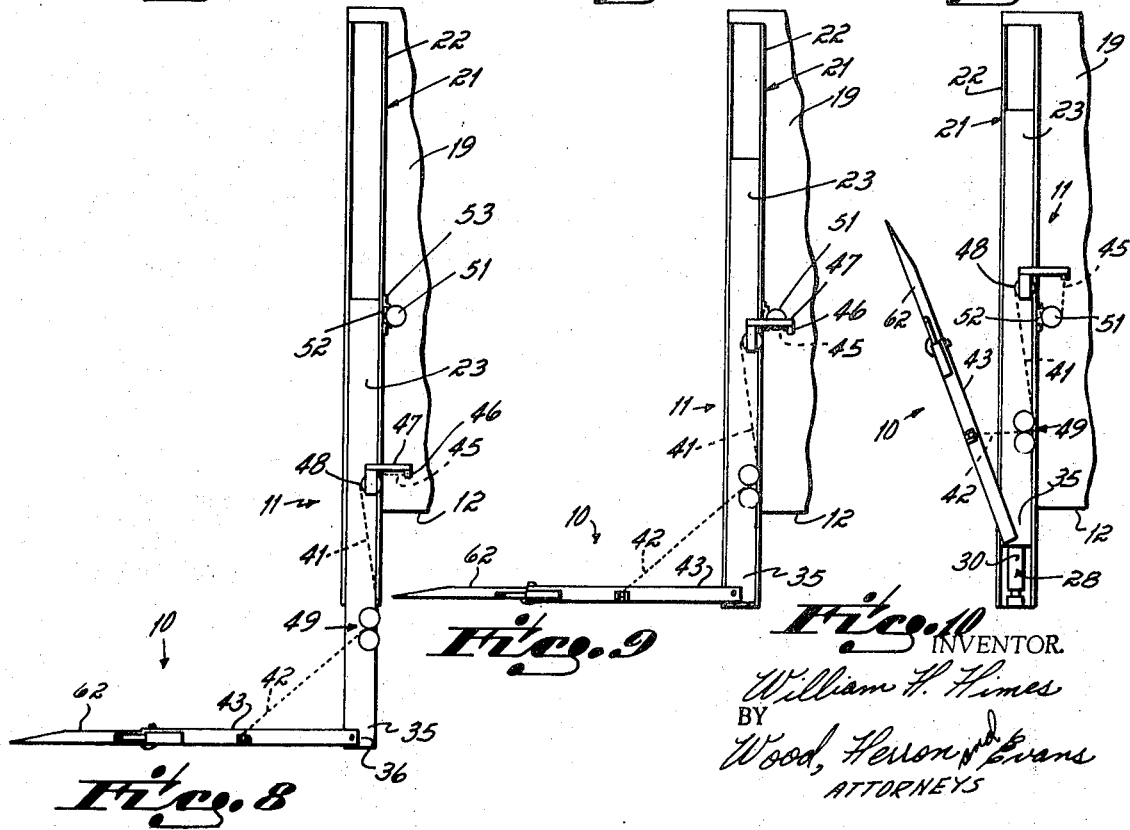

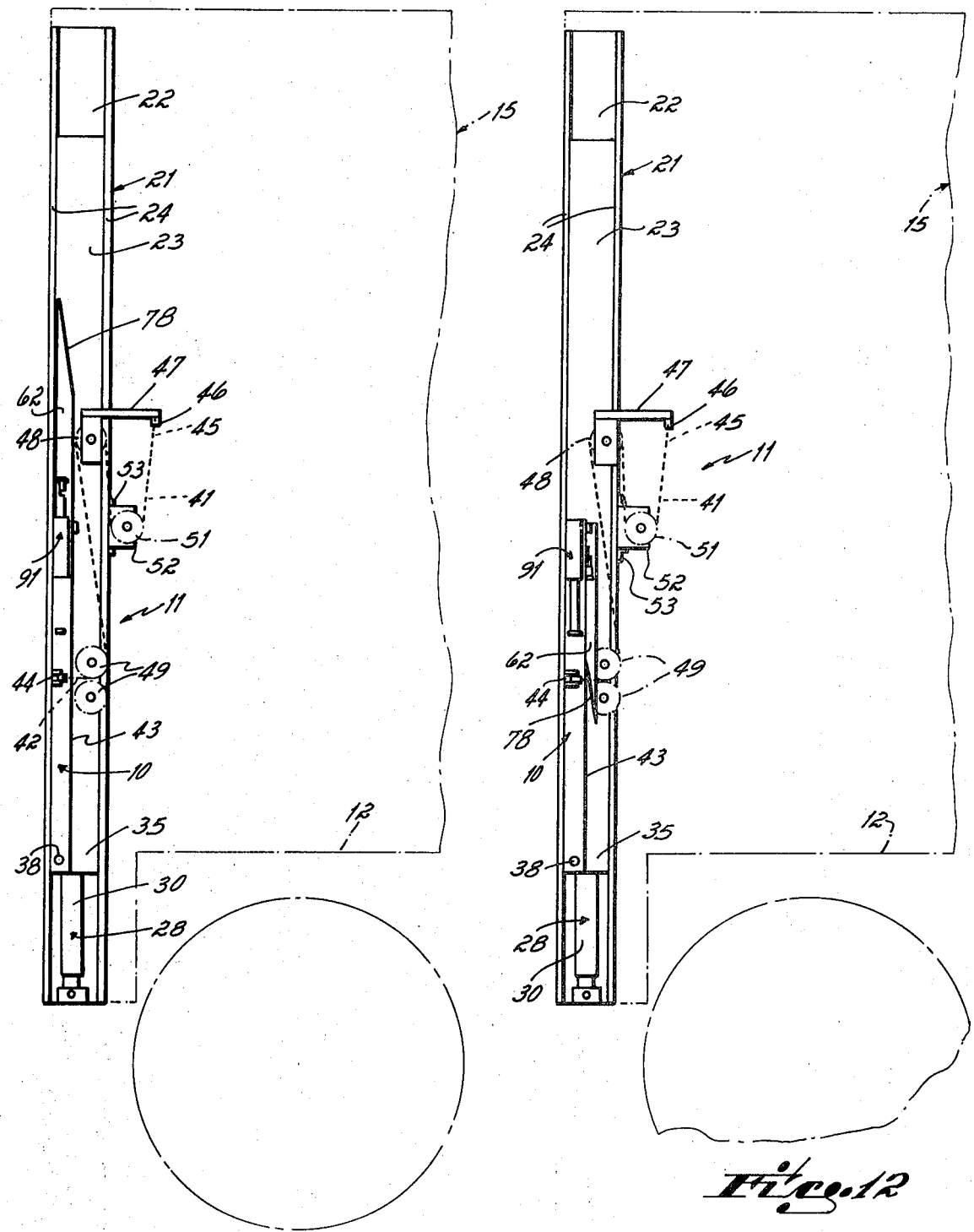

CARGO PLATFORM

This application is a continuation of U.S. Pat. application Ser. No. 872,108, filed Oct. 29, 1969, now abandoned.

This invention relates to cargo platforms and, more particularly, it relates to a cargo platform especially designed for use with combined elevating and storing mechanisms for such platforms.

Cargo platforms that are operable as elevators, and that are storable somewhere about the truck's body so as to be movable with the truck, are well known in the prior art. Such cargo platforms may function solely as elevators, or they may also function as complete or partial closures in the form of doors or tailgates for the cargo area of the truck body. During use such a cargo platform is, of course, movable between (1) a storage position where, depending on the structure of the platform, the platform may be folded upon itself beneath the truck bed, the platform may be vertically disposed about the bed of the truck body so it at least partially closes the rear or cargo opening of the truck body, or the platform may be horizontally disposed closely adjacent the ceiling of the truck body, and (2) a horizontal or open position whereat the cargo area of the truck body is readily accessible and the cargo platform can be raised or lowered as an elevator. Generally, such cargo platforms are mounted in combination with a specially designed, combined elevating and storing mechanism that is supported by the sides and/or bed of the truck body at the rear thereof. A particularly useful type of such a combined elevating and storing mechanism for cargo platforms is illustrated in the patent to W. H. Himes, U.S. Pat. No. 3,371,805, the storage position of the cargo platform described therein being that of vertically disposed above the bed of the truck body so it at least partially closes the rear or cargo opening of the truck body.

When a cargo platform, in combination with a combined elevating and storing mechanism, is used as an elevator, the cargo platform is first moved from its storage position to its horizontal or cargo loading position. Once in the horizontal position, the platform may be moved up and down between the bed or floor of the truck and ground level or a loading dock. Such elevator like movement allows quick, efficient loading and unloading of the truck's cargo space by providing lift means which permits the platform to be adjusted to a first loading level for easy transferal of the cargo onto the platform and, then, to be raised or lowered in a horizontal plane to a second level for easy transferal of the cargo off the platform.

Although such cargo platforms which incorporate an elevator function have been used with the rear of trailer truck bodies for many years, a simple and inexpensive cargo platform design which is of a length greater than the height of the truck bed above ground level has not been heretofore available for use with a truck body having a West Coast type axle system. Generally speaking, a West Coast axle system relates to the wheel and axle suspension system, i.e., the running gear, positioned at the rear of the truck body. In the West Coast axle system, a vertical plane that includes the rearmost surface of the truck body is nearly tangentially disposed with the rearmost pair of wheels. That is, while no point on the rear wheels usually extends beyond the end of the truck body, the rearmost point on the rear wheels' periphery comes very close to intersecting a plane of the rear of the truck body. Such a West Coast axle system has become very popular in the last few years on tractor trailer rigs. One reason is that such an axle system aids the carrier in complying with the so called "bridge laws" of various states. The bridge laws, in effect, require that a certain distance be maintained between the cab for the tractor trailer and the truck body's rear axle so that excess weight will not be concentrated on bridges as the tractor trailer rig progresses thereover. Further, the West Coast axle system, by positioning the rear running gear at the very rear of the truck body, permits the payload or cargo to be stacked substantially evenly throughout the truck body from the front to the rear thereof. Thus, the West Coast axle system precludes the necessity for a complex weight distribution plan for the cargo to be carried by the trailer truck. Further, it is now required under Federal laws that a bumper be positioned at the very rear of the truck body on tractor trailer rigs, the bumper being positioned to extend down to about 20 inches above road level, to prevent automobiles and other vehicles from running underneath the truck body in case of accident. However, with the West Coast axle system no separate bumpers are required because the rearmost wheels themselves act as the bumper and no extra structure is required to satisfy the Federal requirements.

With the advent of West Coast axle systems certain problems were created in the storage of prior art cargo platforms during their periods of non-use. That type of cargo platform, such as is disclosed in U.S. Pat. No. 3,369,678, which is stored by folding the platform in some complex configuration upon itself beneath the truck bed is absolutely not useful with a truck body utilizing a West Coast axle system. In U.S. Pat. No. 3,369,678 it will be noted that complex structural and hydraulic apparatus, all mounted beneath the truck bed at the rear of the truck body, is required to fold the cargo platform upon itself and then retract the folded cargo platform behind the rearmost edge of the trailer truck body so as to remove it from a potentially dangerous position during motion of the vehicle. Obviously in the West Coast tandem axle system there is no available area beneath the rear of the truck body for such a complex apparatus to be mounted because that area is taken up by the running gear. Further, that type of cargo platform, such as disclosed in U.S. Pat. No. 3,363,790, which is stored in the roof of a truck body, i.e., adjacent the ceiling, has not been widely accepted because of its cost, bulkiness and complexity of the structure, and service problems.

A cargo platform such as is disclosed in U.S. Pat. No. 3,371,805, that is moved to a vertical or closing position above the bed of the truck body in tailgate fashion for storage purposes solves the cargo platform storage problem when a West Coast axle system is used on the truck body. Such a combined elevating and closing mechanism as is taught in U.S. Pat. No. 3,371,805 may be easily installed on a truck body with a West Coast axle system to provide an effective elevator function and closure function for the opening to the body's cargo area.

But in certain application where a combined elevating and storing mechanism for cargo platforms is required, it is highly desirable that the cargo platform be substantially greater in length than the height of the truck body's bed above ground level. This for the reason that certain industries have standard loading carts of a length on the order of 60 inches with a width on the order of 30 inches. An average height of the truck body's bed above ground level is only on the order of 45 inches. For efficient loading of the truck body with such carts it is highly desirable to have a cargo platform with dimensions that permit two of such loading carts to be positioned side-by-side and axially of the truck body; this requires a cargo platform having a length of at least about 70 inches and a width of at least about 70 inches.

The width dimension causes no problem since the normal bed width for the truck body of a tractor trailer rig is about 80 inches or more. But the required length dimension leads to a definite problem associated with cargo platforms of the design disclosed in U.S. Pat. No. 3,371,805 at those times when it is desired the rear cargo opening of the truck body to be open and accessible from a loading dock, i.e., at those times when the bed of the truck body is directly accessible from a loading dock and the cargo does not have to be lifted from ground level to the truck bed level by use of the elevator function. During such periods of use the extended length cargo platform must be stored in such a manner that the truck body can be backed up directly adjacent or abutting the loading dock. One potential way of storing the cargo platform of U.S. Pat. No. 3,371,805 in such a manner is to pivot the platform down from its vertical or closed position to a horizontal or elevating position to make the inside of the trailer truck body accessible for loading. However, in this attitude the truck body cannot be backed up to the loading dock, whether the platform is positioned at ground level or at bed level of the trailer truck, because the platform will abut the loading dock footing before the truck body abuts the dock. Further, when the cargo platform is of a length greater than the height of the truck body's bed above ground level the platform cannot be allowed to swing free to hang downward from the rear edge of the truck body's bed because the platform would not hang vertically, but would hang at an angle extended rearwardly of the truck body and engage the ground. With the platform in such a rearward angulated attitude the tractor trailer rig could not be backed up against the loading dock, and even if the truck body could be positioned adjacent the loading dock a gap of substantial width (depending on the angle of the hanging platform relative to a vertical plane) would be established between the loading dock and the truck bed's rear edge because the cargo platform's rear or bottom edge would contact the loading dock footing before the truck body abutted the dock.

Hence, it has been a primary objective of this invention to provide a cargo platform having a length greater than the height of the truck body's bed above ground level which can be readily and easily swung between a horizontal position whereat it is in an elevating attitude to a vertical or hanging position whereat it is suspended down beneath the floor or bed of the truck body so that the body can be backed adjacent a loading dock.

Other objectives and advantages of this invention will be more apparent from the following detailed description taken in conjunction with the drawings in which:

FIG. 1 is a perspective view illustrating the cargo platform of this invention at ground level in extended or platform configuration and in an elevator attitude;

FIG. 2 is a perspective view similar to FIG. 1 illustrating the cargo platform in sandwich configuration and hanging down beneath the truck body's bed in a vertically depending or first storage attitude so that the truck body may back up against the loading dock with the rear opening accessible for loading of cargo;

FIG. 5 is a diagrammatic side view of the cargo platform illustrating the platform at ground level in sandwich configuration with a support chain adjusted to permit movement of the platform into a vertical attitude whereat it hangs beneath the truck body's bed in substantially the same plane as rear opening of the truck body;

FIG. 6 is a view similar to FIG. 5 illustrating operation of the cargo platform while in sandwich configuration as the cargo platform swings downwardly beneath the bed of the trailer truck body;

FIG. 7 is a view similar to FIG. 6 illustrating the cargo platform in sandwich configuration hanging beneath the bed of the truck body in the first storage attitude;

FIG. 8 is a diagrammatic side view of the cargo platform similar to FIG. 5 but illustrating the cargo platform at ground level in extended configuration adapted to position the platform into a vertical or second storage attitude whereat it extends above the truck body's bed in substantially the same plane as the rear opening of the truck body;

FIG. 9 is a view similar to FIG. 8 illustrating elevation of the platform, still in extended configuration, to that position from which it will begin to translate from the horizontal attitude to the vertical or closed attitude;

FIG. 10 is a view similar to FIG. 9 illustrating the cargo platform being pivoted to the vertical or closed attitude;

FIG. 11 is a view similar to FIG. 10 illustrating the cargo platform in the second storage attitude whereat it is closed in the extended configuration; and FIG. 12 is a view similar to FIG. 11 but illustrating the platform in a third storage attitude whereat it is closed in the sandwich configuration.

Figure 3:
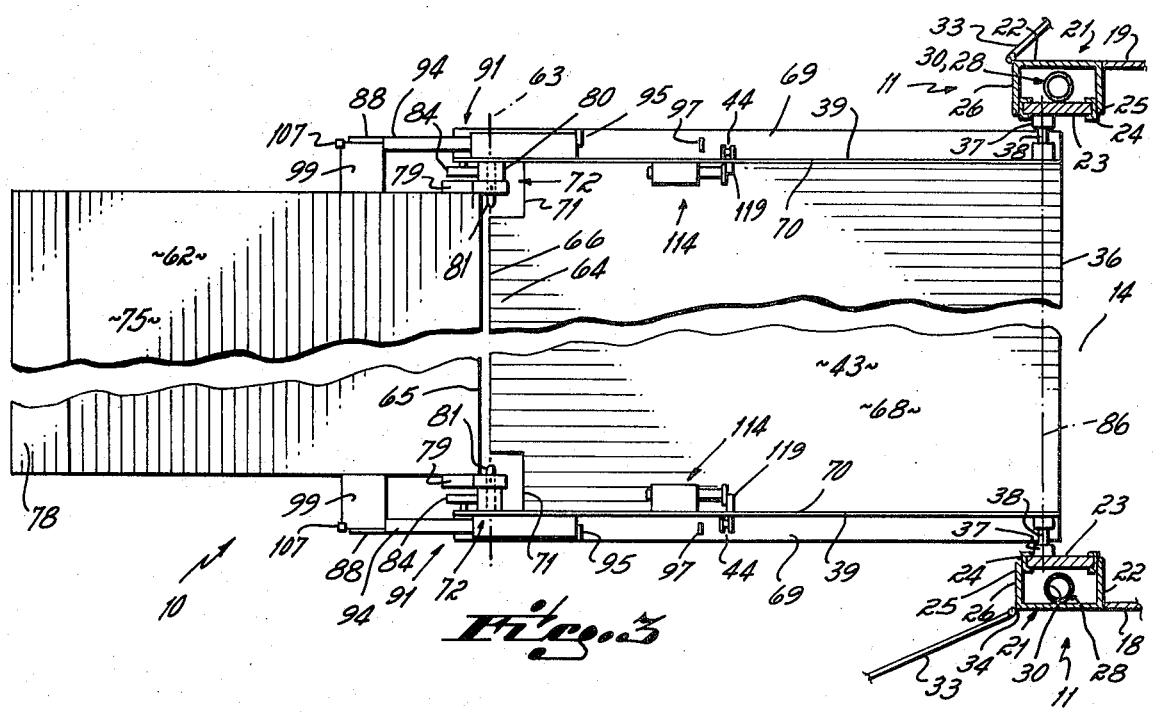
FIG. 3 is a partially cut away top view illustrating the cargo platform in extended configuration, and also illustrating in cross-section the elevating and storing mechanism fixed to the truck body.

The cargo platform 10 of this invention is particularly adapted for use with the combined elevating and storing mechanism 11 disclosed in U.S. Pat. No. 3,371,805; the reference numerals referred to in discussing U.S. Pat. No. 3,371,805 hereinbelow are those assigned to the component parts as shown in this application. Although the mechanism 11 disclosed in that patent and utilized with the platform 10 of this invention is particularly useful and provides numerous advantages over combined elevator and storing mechanisms known to the prior art, the cargo platform 10 therein disclosed has the disadvantages mentioned above when the platform is of a lengh L greater than the height H of the truck body's bed 12 above ground level 13. When a cargo platform 10 is fabricated with such a dimensional configuration it is not possible to store the platform in an attitude whereby the rear opening 14 of the trailer truck body 15 is easily accessible to a loading dock 16. This for the reason that the cargo platform 10 cannot be swung into a vertical attitude whereat it hangs freely suspended beneath the bed 12 of the truck body 15 and, further, the truck body 15 cannot be backed up to the loading dock 16 because the cargo platform 10 will abut the footing 17 of the cargo dock before the rear opening 14 of the truck body is able to move closely adjacent the loading dock. The unique structure of the cargo platform 10 of this invention provides solutions to these problems and is particularly useful with that type of novel elevating and storing mechanism 11 illustrated in U.S. Pat. No. 3,371,805.

THE ELEVATING AND STORING MECHANISM

As is best seen in FIGS. 1–3, the cargo platform 10 of this invention is suitably located at the rear opening 14 of a cargo vehicle, van, or trailer truck body 15 having side walls 18, 19, a top 20 and bed or floor 12, see FIGS. 1 and 2. The cargo platform 10 is connected to the elevating and storing mechanism 11 at the bottom of and between two mast assemblies 21. The mast assemblies 21 are secured to opposite sides 18, 19, of the truck body 15 at the rear vertical edges thereof. Each mast assembly 21 includes a vertical C-shaped channel or mast guide 22. Each mast guide 22 is mounted so that its open side faces the other mast guide across the rear opening 14 of the truck body 15, see FIG. 3. A slide bar or mast 23 is received within each mast guide 22 for vertical sliding movement therein. Each mast 23 is guided in its vertical sliding movement by channel pieces 24 welded to the outer ends 25 of each mast guide's sides 26.

Each mast 23 mounts a cross-brace 27 at its upper end for engagement by mast lifting means to selectively raise and lower the masts in their respective mast guides 22, see FIGS. 1 and 2. The mast lifting means may be either mechanical, hydraulic or pneumatic means, such as a linear fluid motor 28 which is disposed within the interior of each of the mast guides 22. Each motor 28 includes a ram 29 which is coupled to the cross-brace 27. The cylinder 30 of each motor 28 is actuated by pressure fluid supplied by a pump or hydraulic power pack, not shown, mounted within a storage box 31 carried beneath the bed 12 of the trailer body 15 at a position centrally located of the trailer body. The power pack in box 31 may be electrically controlled from equipment stored in control box 32. The control box 32 may be provided with a flexible electrical conduit and controller, not shown, to permit the operator to stand away from or in back of the truck body to observe operation of the cargo platform 10 by the elevating and storing mechanism 11.

The cargo platform 10 is pivotally mounted in a first pivotal joint adjacent its front edge 36 near the bottom ends 35 of the masts 23. Such pivotal connection or first pivotal joint at the bottom end 35 of each mast 23 is achieved by means of a collar 37 fixed to the mast which receives a pin 38 fixed to the side edge 39 of the platform 10 adjacent its front edge 36. When it is open, the cargo platform 10 is maintained in a horizontal position by means of flexible tension means such as, e.g., chains 41, belts or wires, on each side of the platform, each of which cooperates with one mast assembly 21. Each chain 41 is removably secured at its outer end 42 to the cargo platform's front section 43 such as by pinning to a block 44 mounted to each side edge 39 of the platform. Each chain 41 is permanently connected at its other end 45 to a pin 46 carried by finger 47, the finger extending substantially beyond yet being fixed to its associated mast 23 intermediate the ends of the mast. Further, each mast 23 mounts a freely rotating sprocket 48 adjacent the finger 47, and a pair of idler sprockets 49 fixed in position intermediate the finger and the bottom 35 of the mast. When connected at both ends 42, 45, each chain 41 proceeds from its end pinned at block 44, between the pair 49 of idler sprockets, and up over the bearing sprocket 48 to its other end fixed to pin 46.

Each finger 47 extends forward of each mast guide 22 so as to be able to present the chain 41 for engagement with a selectively positionable compounding sprocket 51. Each compounding sprocket 51 is rotatably mounted on a base plate 52 that is adapted for sliding engagement with a pair of rails 53 fixed to each mast channel 22.

When the cargo platform 10 is to be operated in elevator like fashion the chains 41 are connected to pins 46 and block 44, and the base plate 52 is slipped out of engagement with the rail guides 53, thereby removing the compounding sprocket 51 from compounding position. As the masts 23 are moved upwardly or downwardly relative to the mast guides 22, the compounding sprocket 51 remains out of compounding position and does not engage the chains 41 and, thus, the cargo platform 10 operates in elevator fashion. On the other hand, when it is desired to provide the cargo platform 10 in the closed attitude from a horizontal or open attitude, i.e., in the second or third storage attitude, the base plates 52 carrying the compounding sprockets 51 are inserted between the guide rails 53 on each mast channel 22 so as to present the compounding sprockets 51 in the vertical path of the chain ends 45. This permits the chains 41 to be compounded or doubled as the masts 23 move upwardly within the mast guides 22 to close the cargo platform. This combined elevating and storing mechanism 13 described above is one of the preferred embodiments of, and is more particularly set forth in U.S. Pat. No. 3,371,805.

Suitable rear doors 33 may be mounted to the corner edges 34 of each of the mast assemblies 21 so as to pivot between a completely open position whereat they are flush against the side walls 18, 19 of the truck body 15 to a completely closed position whereat they cover the entire rear opening 14 of the truck body. In the door 33 closed position, and with the cargo platform 10 stored in either the extended configuration as shown in FIG. 11 or the sandwich configuration as shown in FIG. 12, the platform, the elevating and storing mechanism 11, and the interior of the truck body 12 is closed to the environment, e.g., weather conditions, surrounding the truck body.

THE CARGO PLATFORM

As mentioned it is oftentimes desirable to provide a cargo platform 10 that has an extended length L substantially greater than the height H available between ground level 13 and the bed 12 of the truck body 15. For example, a distance between ground level 13 and the bed 12 of a trailer truck body 15 on the order of about forty five inches is considered average. However, oftentimes a cargo platform 10 is preferred to have an extended length L on the order of, for example, eighty inches, with a width W substantially equal to the bed 12 width of the trailer truck body 15. This for the reason that certain industries find it desirable to be able to position two mobile container or loading carts 61 on the cargo platform 10 at the same time when the cargo platform is being used as an elevator. Such loading carts 61 may be of differing external dimensions but one standard cart is about 60 inches in length and 30 inches in width. Two of such dimensioned carts 61 can fit side-by-side, i.e., widthwise, because the standard width of a truck body and, hence of the cargo platform fixed to the end of the truck body, is about 8 inches. But two of such dimensional carts 61 cannot be positioned lengthwise of the trailer truck body's axis unless the cargo platform 10 is greater than the length of each cart 61; this requires that the length of the cargo platform 10 be substantially longer than the height H of the truck body's bed 12 above the ground 13.

The cargo platform 10 of this invention basically includes the front section 43 and a rear section 62, that is, the cargo door is articulated into two half sections 43, 62 with these sections being hinged together at a second pivotal joint along a hinge line 63 transverse to the axis of the truck body. The front section 43 is pivotally mounted in a first pivotal joint, as at 37, 38 and as mentioned, between the two mast assemblies so that the platform may pivot between a second or third storage position whereat it is disposed vertically above the bed 12 of the truck body 15 and at least partially closes the rear opening 14 of the body (see FIGS. 11 and 12), to an elevator position whereat it extends horizontally and rearwardly of the truck body (see FIG. 1), to a first storage position whereat it hangs vertically beneath the bed of the truck body (see FIGS. 2 and 7).

The front section 43 includes a metal plate 68 provided with an angle member 69 mounted along each side 39 for support. Each angle member 69 is welded to the plate 68 so that the top 70 of the member is substantially flush with the top surface of the plate. It will be noted that the angle members 69 extend beyond the trailing or rear edge 66 of the plate 68 but are flush with the leading or front edge 36 of the plate. Further, suitable ribs, not shown, may be mounted beneath the plate 68 to provide added structural support if desired, but such ribs should be coextensive with the plate.

The rear section 62 of the cargo platform 10 is also in the form of a plate 75 having depending side walls 76, the side walls being of substantially the same height as the side walls of the front section 43. Further, the rear section 62 may also be provided with reinforcing ribs, not shown, beneath the plate 75 if desired. The rear end 78 of the rear section 62 is provided with a taper or bevel or otherwise configured to provide easy access for the carts 61, fork trucks or other loading devices or cargo as they are located on the platform preparatory to lifting same from ground level to truck bed level when the elevating and storing mechanism 11 is in the elevating attitude.

The rear end 64 of the front section 43 and the front end 65 of the rear section 62 are pivotally connected at the second pivotal joint with the pivot axis 63 coinciding with the trailing edge 66 of the front section, see FIG. 3, so as to permit the two sections of the platform 10 to be pivoted between an extended configuration (see FIGS. 1 and 8-11) and a sandwich configuration (see FIGS. 2 and 5-7, and 12) as desired by the operator. The trailing edge 66 of the front section 43 is notched, as at 71, at each corner thereof relative to the sides 39 of that section. The notches 71 accomodate pivot mountings 72 by which the rear section 62 is pivotally mounted to the front section 43. The pivot mountings 72 are such that the plane of the top surface of the rear section 62 is in substantially the same plane as the top surface of the front section 43 when the two are in the extended position. Each side wall 76 of the rear section 62 mounts a pin block 79 fixed thereto toward the leading edge 65 of the rear section 62, the blocks extending into the notches 71 cut in each rear corner of the front section's plate 68 when the rear section 62 and front section 43 are in substantially the same horizontal plane, see FIGS. 3 and 4. A hub 80 is welded to the inside of each angle member 69 with each hub having a cylindrical bearing surface adapted to receive a pin 81. Each of the blocks 79 is provided with a hole through which the pin 81 is slipped into cooperative engagement with the hub 80, the pin being a separate element and being held in operable engagement between the hub and the block by a set screw 82, cotter pin or the like. Hence, the pins 81 are fixed to pin blocks 79 by set screws and are pivotable in hub 80; thus, the pivot mountings 72 hold the front 43 and rear sections 62 together in pivotal relation with a gap 83 being created between the front section's trailing edge 66 and the rear section's leading edge 65.

As noted, each of the angle members 69 extend substantially beyond the trailing edge 66 of the front section 43. The inside wall 77 of each angle member mounts antifriction means in the form of a wheel 84 with the axis of each of those wheels being behind or to the rear of the front section's trailing edge 66 and the rear section's leading edge 65, see FIGS. 3 and 4. Further, it will be noted that the wheels 84 are mounted so that they at least partially extend below and beyond the side walls 77 of the angle members 69. Thus, at least one wheel 84 is fixed to one of the platform sections 43, 62 adjacent that edge where the two sections are pivotally joined in the second pivotal joint. This mounting configuration for the wheels 84 is important in that when the front 43 and rear 62 sections are in sandwich configuration the wheels provide a rolling surface always in contact with the ground as the platform is lifted by the elevating and closing mechanism 11 (when the chains 41 are not pinned to blocks 44) from a horizontal attitude whereat it rests on the ground and extends outwardly of the first pivotal joint (the pivotal axis 86), see FIG. 5, to a vertical attitude whereat it hangs in the same plane as a vertical plane incorporating the first pivotal joint (the pivotal axis 86), see FIG. 7. That is, the wheels 84 or anti-friction means provide reduced frictional contact with the ground as the platform, when in sandwich configuration, is lifted at the first pivotal joint by the elevating and storing mechanism from a horizontal attitude where it rests on the ground until it reaches a substantially vertical attitude where it hangs beneath the truck body's bed.

Figure 4:
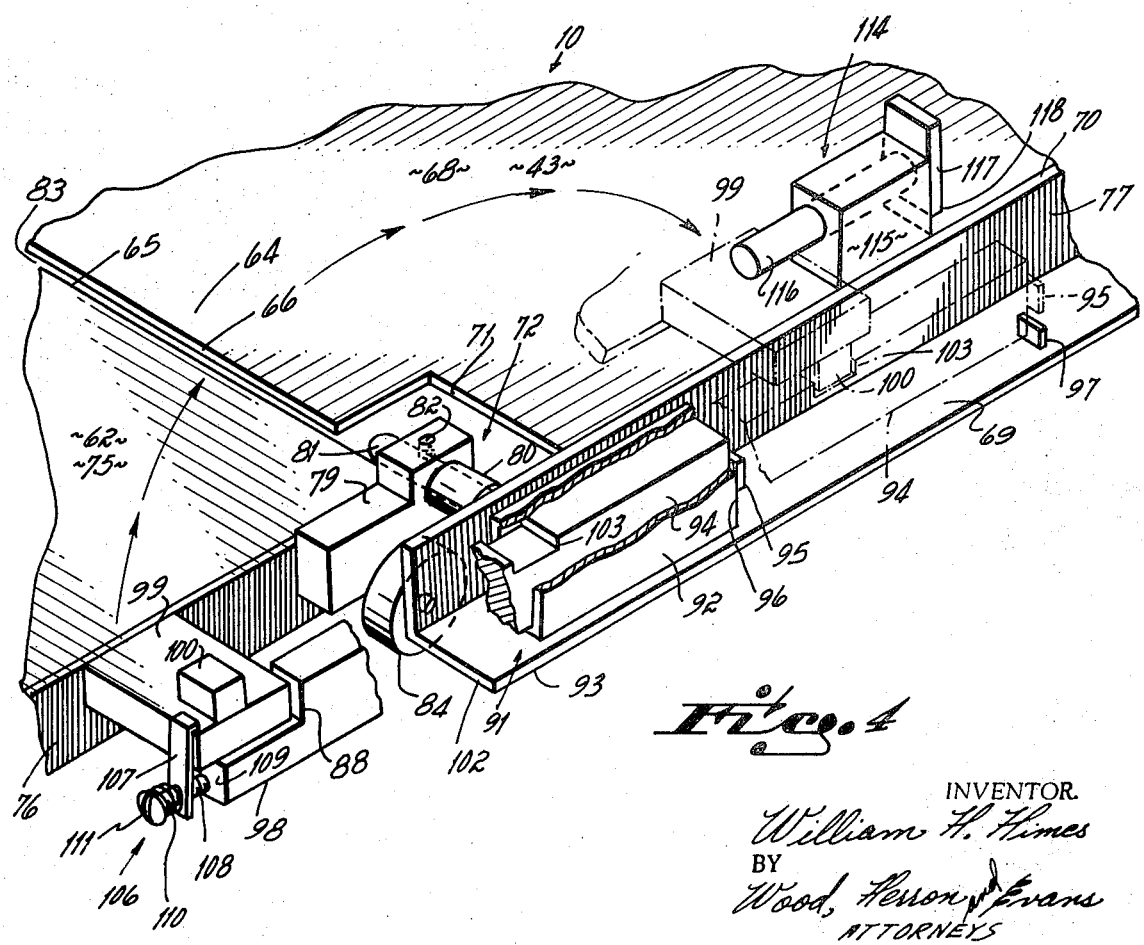
FIG. 4 is a detailed perspective view illustrating the lock and support mechanism associated with the cargo platform.

Supports or support means 91 is also associated with the two platform sections 43, 62 to hold the sections in the platform or extended configuration when desired, part of the support means being carried by each of the sections 43, 62, see FIGS. 3 and 4. The rear section 62 carries a support block 99 mounted to side walls 76 and extending outwardly therefrom. Each support block 99 mounts a centering block 100 that is positioned on its top face when the sections 43, 62 are in platform configuration. The front section carries a sleeve 92 of rectangular cross-section mounted to the trailing end 93 of each angle member 69. Each sleeve 92 receives a bolt 94 in sliding engagement therewith, the bolt being provided with a head 95 that is adapted to engage a lip 96 of the sleeve so as to limit its extendable movement, see solid lines of FIG. 4. An abutment 97 is mounted forwardly of the sleeve 92 and is positioned to limit the bolt's retractable movement, see phantom lines of FIG. 4. Also, the tails 98 of the bolts are notched, as at 88, to receive support blocks 99.

Thus, the bolts 94 are extendable to a first position whereat the notched ends 98 receive support blocks 99 and, thereby, support the two sections 43, 62 in extended or platform configuration, see solid lines of FIG. 4; heads 95 of the bolts abut lips 96 on the sleeves 92 to prevent the bolts from slipping out of the sleeves when in this attitude. Further, the bolts 94 are retractable to a second position whereat the heads 95 abut abutments 97, this position retracting the notched end 98 of the bolt beyond the ends 102 of the angle member 69 into the sleeves. In this retracted attitude the rear platform section 62 may be folded into sandwich configuration with the front platform section 43, the centering blocks 100 falling into centering notches 103 in the bolts 94, see phantom line position of FIG. 4. Cooperation between centering block 100 and centering notches 103 keeps the bolts 94 from moving out of the retracted position toward the extended position as the platform, in sandwich configuration, is allowed to swing downwardly into its hanging position whereat it is disposed vertically beneath the truck body's bed 12.

The notched end 98 of each bolt 94 also mounts a latch 106 which cooperates with the support blocks 99 to hold the two sections 43, 62 in extended configuration if the platform 10 is closed in the attitude illustrated in FIG. 11. That is, the latches 106 prevent the rear section 62 from inadvertently falling into sandwich configuration with front section 43 when the platform 10 is positioned in a closed attitude vertically above the truck body's bed. Each latch is comprised of a latch finger 107 carried by a pin 108 that is fixed to the end 109 of the bolt 94. The finger 107 is constantly biased toward the bolt by spring 110. Thus, when the two sections 43, 62 are disposed in extended configuration the two latch fingers 107 need merely be biased against spring 110 and snapped over support blocks 99. If such latches 106 are used, the bolts 94 must be retractable in sleeves 92 to a point that permits the pins' heads 111 to retract behind edges 102 of angle members 69.

The front section 43 also carries locks 114 for holding the two platform sections 43, 62 in sandwich configuration when that configuration is desired. A lock 114 is mounted to the front plate 68 along each side edge 39 thereof. Each lock is comprised of a sleeve 115 fixed to plate 68 that receives a bolt 116. The bolt 116 is provided with a head 117 which cooperates with the front lip 118 of the sleeve 115 to prevent the bolt from slipping out of the sleeve 115 when the platform 10 is in sandwich configuration and hanging vertically beneath the bed 12 of the truck body 15 as shown in FIG. 2. An abutment 119 is also mounted to the plate 68 forward of each sleeve 115 to engage head 117, thereby preventing the bolt 116 from falling out of the sleeve 115 when the platform is positioned vertically above the truck body's bed 12 in the closed attitude.

The locks 114 function only when the platform 10 is in sandwich configuration, and in that configuration the support blocks 99 fixed to rear section 62 are positioned adjacent sleeves 115. In this position the bolts 116 slip over the support blocks 99 to prevent the front 43 and rear 62 sections from pivoting relative one to the other when the platform, in sandwich configuration, is hung vertically beneath the truck body's bed.

OPERATION OF THE PLATFORM

In operation of the cargo platform 10 of this invention, when the platform is in the elevating attitude the chains 41 are interconnected with the platform at pin blocks 44. The platform 10 itself is disposed in the extended configuration as illustrated in detail in solid lines of FIGS. 3 and 4. In the extended or platform configuration bolts 94 are extended until heads 95 abut the lips 96 of sleeves 92; this permits the support blocks 99 of the platform's rear section 62 to be seated in the notched ends 98 of the bolts 94 to support same. In this elevating attitude, the platform 10 can function as an elevator when compounding sprockets 51 are removed from rails 53 simply by moving the masts 24 upward and downward relative to the mast guides 22 as taught by U.S. Pat. No. 3,371,805. Further, the platform 10 may be closed to the second storage attitude while in the extended configuration simply by lowering the platform to ground level 13, replacing the compounding sprockets 51, and again moving the masts 23 upward relative to the mast guides as disclosed in U.S. Pat. No. 3,371,805, see FIGS. 8-11.

To place the platform 10 in sandwich configuration, the rear section 62 is simply pivoted to overlie the front section 43 and the bolts 94 retracted relative to sleeves 92. Thereafter, bolts 116 are extended to overlie support blocks 99. Because the platform sections 43, 62 are usually quite heavy, the transformation of the platform 10 from the extended configuration to the sandwich configuration and vice versa, is usually carried out with the platform sections resting on ground level; this is especially the case if only one man is available to make the configuration change. In the sandwich configuration, and with chains 41 connected to pin blocks 44, the platform may also be closed or stored in a third storage attitude vertically disposed above the truck body's bed, see FIG. 12. Such closing or storing of the platform 10 when in sandwich configuration is accomplished with compounding sprockets 51 disposed as shown in FIGS. 8-10, and is identical to closing of the platform when in the extended configuration to the second storage attitude as discussed.

However, the sandwich configuration of the platform 10 also can be stored in a position that does not partially close the truck body's rear opening 14 when it is desired to back up the truck body against a loading dock, i.e., a first storage attitude, as illustrated in FIG. 2. The method step sequence for achieving such a result is illustrated in FIGS. 5-7. First, the cargo platform 10 is lowered to rest on ground level 13 as illustrated in FIG. 5. At that position the removable end 42 of each chain 41 is unpinned from engagement with pin blocks 44. The rear section 62 is locked in sandwich configuration with the first section 43 because bolts 116 extend through sleeves 115 so that the bolts overlie the shoulder blocks 99 disposed on top of the front section. It will be particularly noted, from FIG. 5, that there is a clearance between the bottom 121 of the front section and ground level which is caused by the presence of anti-friction means or wheels 84, thereby providing a rolling surface that extends below the bottom of the front section. Further, it will be noted that wheels 84 provide a rolling surface that extends beyond the rearmost edges 102 of the sections when those sections are in the sandwich configuration. The masts 23 of the elevating and closing mechanism 13 are thereafter raised relative to the mast guides 22 so that the sandwich configured cargo platform 10 pivots about its first pivotal joint or pivot axis 86, see FIG. 6. As the masts 23 move upwardly the cargo platform 10 swings to a point where it is vertically disposed relative to the slide bar-mast assemblies 21 and hangs vertically downward beneath the truck body's bed 12 with the wheels 84 slightly raised off ground level 13, see FIG. 7. The platform is thus positioned in the same vertical plane as incorporates the first pivotal joint and the rear opening of the truck body. As the sandwich configured cargo platform swings to the downward hanging position the platform is prevented from dragging on the ground because of the wheels 84 located at either side of the cargo platform, the wheels being mounted relative to the platform 10 structure such that a wheel surface is always exposed to ground during movement of the sandwich configured cargo platform from that position illustrated in FIG. 5 to that position illustrated in FIG. 7. That is, there is no scraping or other mutilation of either the ground or pavement, or of the cargo platform itself, as the platform is moved to that position shown in FIG. 7 from that position shown in FIG. 5.

Having described the preferred embodiment of my invention in detail, what I desire to claim and protect by Letters Patent is:

1. A cargo platform fixed to a truck body and adapted for use with a combined elevating and storing mechanism carried by said truck body, said platform being adapted for lowering by said combined elevating and storing mechanism to ground level where said platform lies horizontal on the ground, comprising
   a first platform section mounted along its front edge to said combined elevating and storing mechanism by a first pivotal joint,
   a second platform section mounted to said first section adjacent the rear edge of said first section by a second pivotal joint, the combined length of said first and second platform sections being of a length greater than the height of the truck body's bed above ground level,
   a support mechanism combined with said two sections that holds said two sections in platform configuration when desired, and that allows said two sections to pivot between platform configuration and sandwich configuration by means of said second pivotal joint when desired, said platform sections capable of being transposed from the platform configuration to the sandwich configuration while lying on ground level,
   anti-friction means fixed to one of said two sections adjacent that edge where said sections are pivotally joined, said anti-friction means providing reduced frictional contact of said platform with the ground as said platform, when in sandwich configuration, is lifted at said first pivotal joint by said elevating and storing mechanism from a horizontal attitude where it rests on the ground and extends outwardly of the first pivotal joint until it reaches a substantially vertical attitude where it hangs beneath the truck body's bed,
   a lock mechanism combined with said two sections that restrains same in sandwich configuration when desired, and
   apparatus associated with said platform sections that maintains said platform sections in a horizontal attitude while in platform configuration when operating said platform in elevator fashion through one of said combined elevating and storing mechanism, and that permits said platform sections to be moved by said combined elevating and storing mechanism to a position where said platform sections may hang in sandwich configuration in a substantially vertical attitude beneath the truck body's bed when storing said platform in a manner that makes the inside of the truck body accessible for loading.

2. A cargo platform as set forth in claim 1 wherein said anti-friction means is in the form of at least one roller that provides a rolling surface by which contact with the ground is maintained.

3. A cargo platform as set forth in claim 1 wherein said apparatus associated with said platform sections is in the form of flexible tension means connected between said platform and said combined elevating and storing mechanism when operating said platform in elevator fashion, said flexible tension means being disconnected between said platform and said elevating and storing mechanism when storing said platform in a substantially vertical attitude beneath the truck body's bed.

4. A cargo platform as set forth in claim 1
   wherein said support mechanism includes a first bolt mounted to one of said two sections, and a support block mounted to the other of said two sections, said first bolt being slidable to an extended position at which said support block engages said first bolt to support said sections in platform configuration and a retracted position at which said anti-friction means can maintain contact with the ground as the platform, when in sandwich configuration, is lifted from said horizontal attitude to said substantially vertical attitude, and
   wherein said lock mechanism includes a second bolt that is slidable between an extended position at which it overlies said support block when said two sections are in sandwich configuration to lock said two sections in sandwich configuration and a retracted position at which said two sections are pivotable relative one to the other into and out of sandwich configuration.

* * * * *